(12) United States Patent
Cohen et al.

(10) Patent No.: US 10,739,120 B2
(45) Date of Patent: Aug. 11, 2020

(54) EXPLOSIVE SEPARATING JOINT

(71) Applicant: NORTHROP GRUMMAN INNOVATION SYSTEMS, INC., Plymouth, MN (US)

(72) Inventors: David Bruce Cohen, Phoenix, AZ (US); John Thomas Doyle, Lovettsville, VA (US); Richard Mark Haynie, Queen Creek, AZ (US); Paul Jesse Harrington, Queen Creek, AZ (US); Gary Ronald Burnside, Phoenix, AZ (US)

(73) Assignee: Northrop Grumman Innovation Systems, Inc., Plymouth, MN (US)

( * ) Notice: Subject to any disclaimer, the term of this patent is extended or adjusted under 35 U.S.C. 154(b) by 85 days.

(21) Appl. No.: 16/175,020

(22) Filed: Oct. 30, 2018

(65) Prior Publication Data

US 2019/0128653 A1 May 2, 2019

Related U.S. Application Data

(60) Provisional application No. 62/579,020, filed on Oct. 30, 2017.

(51) Int. Cl.
*F42B 15/38* (2006.01)
*B64G 1/64* (2006.01)
*F42B 3/093* (2006.01)

(52) U.S. Cl.
CPC .............. *F42B 15/38* (2013.01); *B64G 1/641* (2013.01); *B64G 1/645* (2013.01); *F42B 3/093* (2013.01)

(58) Field of Classification Search
CPC .......... F42B 15/38; F42B 3/093; B64G 1/641; B64G 1/645
See application file for complete search history.

(56) References Cited

U.S. PATENT DOCUMENTS

| 3,185,090 A | 5/1965 | Weber | |
|---|---|---|---|
| 3,335,664 A | * 8/1967 | Enzian | F42D 3/00 102/307 |
| 3,486,410 A | * 12/1969 | Lake | F42B 15/38 89/1.14 |

(Continued)

FOREIGN PATENT DOCUMENTS

| EP | 0596400 | 12/1998 |
|---|---|---|
| WO | WO98/49516 | 11/1998 |

*Primary Examiner* — Michelle Clement
(74) *Attorney, Agent, or Firm* — Christensen, Fonder, Dardi & Herbert PLLC (57) ABSTRACT

An explosive separation joint system having an expandable tube containing a mild detonating fuse (MDF) in separable portions of the joint. The MDF extends into a detonation manifold at a first port, an end of the MDF having booster bonded thereto. An external initiating ordnance transfer line enters the manifold at an initiating ordnance (IO) port, has an IO end tip and provides a detonation impulse train where each detonating component is axially aligned within a passageway with the next detonating component. In embodiments, particular detonating components of the detonation train are fixed in place where other detonating components are movable. Each detonating component that is not in direct contact with a preceding detonating component in the detonation train is in direct linear access.

20 Claims, 12 Drawing Sheets

(56) References Cited

U.S. PATENT DOCUMENTS

| | | | | |
|---|---|---|---|---|
| 3,698,281 | A | * | 10/1972 | Brandt ...................... C06C 5/06 89/1.14 |
| 4,022,129 | A | * | 5/1977 | Day ........................ F02K 9/978 102/378 |
| 4,685,376 | A | * | 8/1987 | Noel ...................... F42B 15/38 102/378 |
| 5,327,835 | A | | 7/1994 | Adams et al. |
| 5,331,894 | A | * | 7/1994 | Wassell ................... F42B 15/36 102/275.11 |
| 5,365,851 | A | | 11/1994 | Shaw |
| 5,372,071 | A | * | 12/1994 | Richards ................ B64G 1/641 102/378 |
| 5,390,606 | A | * | 2/1995 | Harris .................... B64G 1/641 102/275.11 |
| 5,392,684 | A | * | 2/1995 | Renfro .................... F42B 15/38 102/378 |
| 5,417,162 | A | | 5/1995 | Adams et al. |
| 5,423,263 | A | * | 6/1995 | Rontey .................... C06C 5/06 102/275.12 |
| 5,535,502 | A | | 7/1996 | Harris |
| 5,898,123 | A | | 4/1999 | Fritz et al. |
| 6,021,715 | A | * | 2/2000 | Fritz ...................... F42B 15/38 102/275.11 |
| 6,305,287 | B1 | * | 10/2001 | Capers .................... C06C 5/06 102/275.11 |
| 2019/0128653 | A1 | * | 5/2019 | Cohen .................... B64G 1/641 |

\* cited by examiner

EXPLOSIVE SEPARATING JOINT

This application claims the benefit of U.S. Provisional Application No. 62/579,020, filed Oct. 30, 2017, the contents of which are herein incorporated by reference.

BACKGROUND OF THE INVENTION

The invention relates to explosive separation joint systems such as utilized for separation of launch vehicles. Such joints utilize mild detonating fuses (MDF) that extend from the separable portions into a detonation manifold and are initiated by an external initiating ordnance such as flexible confined detonating cord also extending into the detonation manifold. The MDF having an end with a booster attached thereto. The initiating ordnance positioned to provide an impulse perpendicularly to the axis of the MDF and being in alignment with the MDF booster. The MDF may be in a flattened steel tube and upon detonation of the MDF by the initiating ordnance the steel tube expands to a circular cross sectional configuration that ruptures or causes disengagement of separable portions of the joint allowing separations of portions of a launch vehicle or spacecraft. Any operational failure of such joint separating portions can be expected to be catastrophic to the mission. Any reduction in the risk of failure of such joints would be appreciated by the industry.

SUMMARY OF THE INVENTION

In embodiments of an explosive separation joint system, a manifold provides reliable detonation of an MDF and separation of the joint. The inventors have discovered a failure path of conventional detonation manifolds which have the initiating ordnance is oriented perpendicular to the MDF end and booster. The MDF is not tightly constrained with in the joint and manifold and is subject to thermal, dynamic, and inertial stresses that may move the MDF end with booster out of a critical operation zone of the initiating ordnance, interrupting the detonation train, thereby precluding detonation of the MDF by the initiating ordnance causing a separation failure.

In embodiments, the separation joint system having an expandable tube containing a MDF positioned within a cavity defined at least partially by separable portions of the joint. The separable portions deform upon expansion of the expandable tube thereby fracturing or otherwise disengaging the separable portions from one another. Pre-detonation, the MDF extends from the separable portions of the joint into a detonation manifold by way of MDF port, the MDF having an end with a MDF booster bonded to the MDF end. In embodiments, an external initiating ordnance transfer line enters the manifold at an initiating ordnance (IO) port, has an IO end tip and provides a detonation impulse train where each detonating component is axially aligned within a passageway with the next detonating component. In embodiments, particular detonating components of the detonation train are fixed in place where other detonating components are movable. Each detonating component that is not in direct contact with a preceding detonating component in the detonation train is in direct linear access.

In embodiments, the axis of the MDF port and IO ports are positioned at or substantially perpendicular to one another and an intermediary transfer booster is positioned between the booster bonded to the MDF end and an initiating ordnance end tip. In embodiments, the MDF booster bonded to the MDF end is flanged, seats on a shoulder in the manifold, and is constrained in moving toward the intermediary transfer booster. In embodiments, the intermediary transfer booster is flanged to be fixed into a seating position within the manifold. In embodiments the axis of an end portion of the MDF, an axis of the MDF booster axis, and an axis of the MDF passageway, are all coextensive with the MDF port axis. An axis of the IO end portion, the IO end tip, and the IO passageway in the manifold are all coextensive with the IO port axis.

In an embodiment with the MDF port and IO port positioned in non axial alignment, an intermediary transfer booster is in axial alignment with both the MDF port and IO port.

In an embodiment with the MDF port and IO port positioned in non-axial alignment, an intermediary transfer booster is not in axial alignment with both the MDF port and IO port and a flexible transfer element connects the transfer booster to the MDF booster or IO end tip, whichever of the two is not in axial alignment with the intermediary transfer booster.

A feature and advantage of embodiments is that the precision with which the joint, including the manifold, must be designed and manufactured is reduced, thereby reducing manufacturing costs.

A feature and advantage of embodiments is an MDF positioned in a manifold that is constrained in an inward direction by a seating shoulder to stop the MDF but not constrained in the opposition direction away from the MDF. This allows the MDF to be inserted with some slight compression of the MDF which may initially minimize any MDF movement due to the extreme conditions of temperature, vibration, shock, acceleration, and stress that the joint and MDF therein is subjected to during launch.

A feature and advantage of embodiments is a manifold having an MDF port with an MDF, an IO port with an IO, and an intermediary booster positioned intermediate the MDF and IO and captured in a fixed position within the manifold. In embodiments, the intermediary booster having a flange for securing the intermediary booster into position. In embodiments, the flange is a unitary part of the booster material, in embodiments, the flange is a separate piece attached to the booster material.

A feature and advantage of embodiments is that the impulse path for initiating detonation of the MDF is altered 90 degrees while still providing reliable operation. A feature and advantage of embodiments is that each sequential detonating component in the manifold is in axial alignment with the previous component, or in direct contact.

A feature and advantage of embodiments is a separable joint with an MDF therein, the MDF in detonating connection to a IO at a manifold, the MDF entering the manifold at an MDF port and being axially blocked from moving inwardly by a flange on an MDF booster attached to the MDF that seats on a shoulder facing outwardly toward the MDF. The MDF booster and attached MDF not blocked from moving in a direction away from the shoulder. In embodiments, the MDF is blocked from moving in a forward direction away from the MDF by a transfer booster fixed in position in the manifold. In such an embodiment the MDF and MDF booster may not have an annular flange. In embodiments the transfer booster is fixed in position by a flange integral or unitary with the transfer booster. And the transfer booster face facing the MDF provides the stop of the MDF.

A feature and advantage of embodiments is that the MDF with the portion of the MDF that is first detonated being constrained from moving toward the IO, and wherein the entire range of movement of the MDF is within a detonating range of the detonating component that detonates before the MDF. A further feature and advantage of embodiments, is that the portion of the MDF that first detonates is precluded from moving past an IO passageway that intersects the MDF passageway. In embodiments such is provided by a blocking surface on the manifold or the preceding detonation component.

In embodiments, a manifold for a separable joint has a MDF port with an MDF passageway and a IO port with an IO passageway positioned 90° apart on the manifold with a detonating train of at least three separated detonating components arranged to detonate sequentially with the first detonating component exclusively in the IO passageway, a second detonating component in an intersection of the IO and MDF passageway, and a third detonating component exclusively in the MDF passage way, whereby each sequential component is in direct linear access with the next sequential component. In embodiments the first detonating component is a IO end tip, the second detonating component is a transfer booster, and the third detonating component is an MDF booster connected to an MDF.

A feature and advantage of embodiments of the invention is that movement of the MDF within the manifold is accommodated assuring the reliable transfer of the initiating pulse, reducing the risk of failure of separation of the separation joint system.

DETAILED DESCRIPTION

Figures 1, 2, 3:
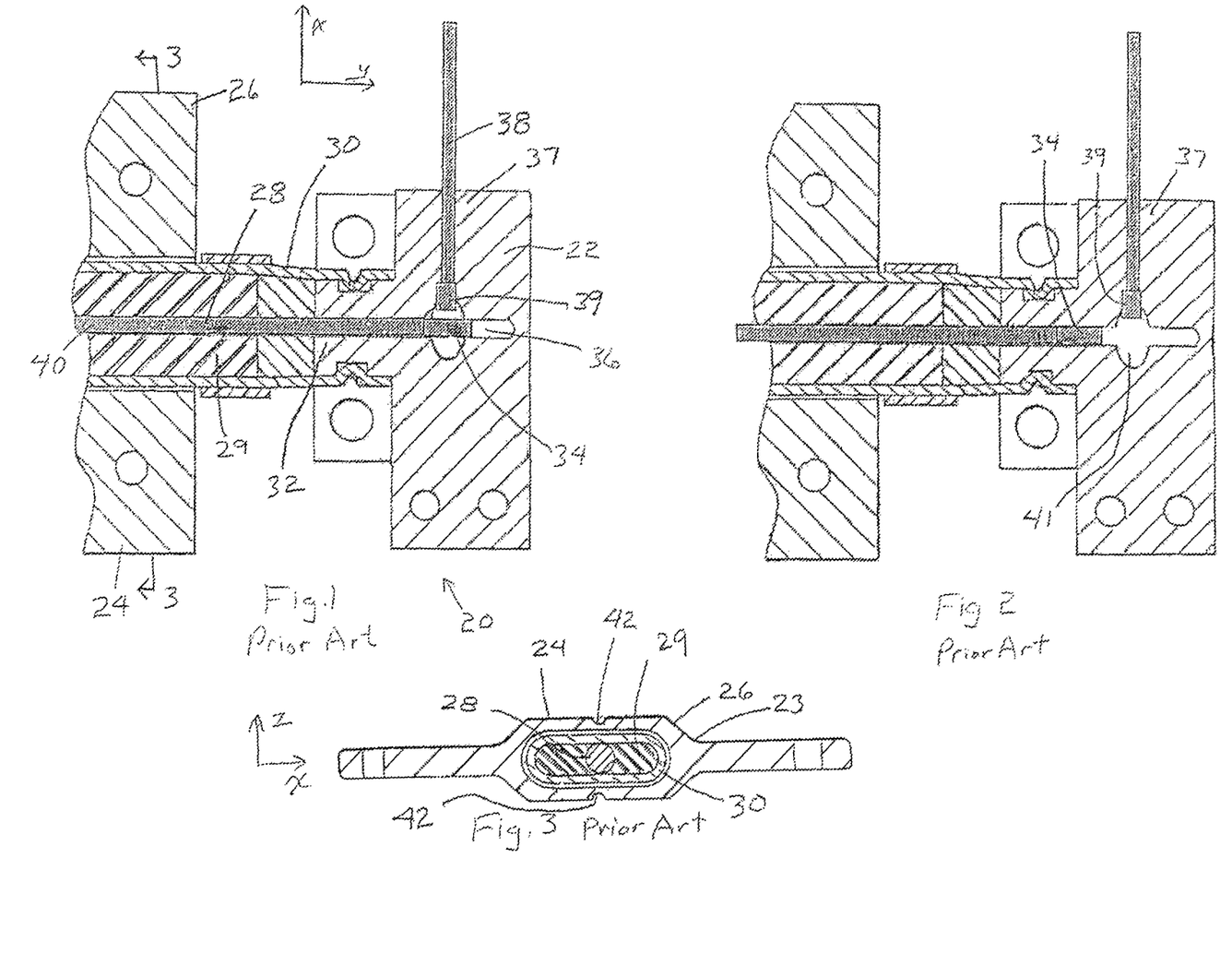
FIG. 1 depicts a cross section of a prior art explosive separation joint system with a manifold and with the IO aligned with the MDF.
FIG. 2 depicts the prior art explosive separation joint system of FIG. 1 with the IO and MDF out of alignment.
FIG. 3 is a perspective view of an explosive separation joint system in accord with embodiments.
Figure 4:
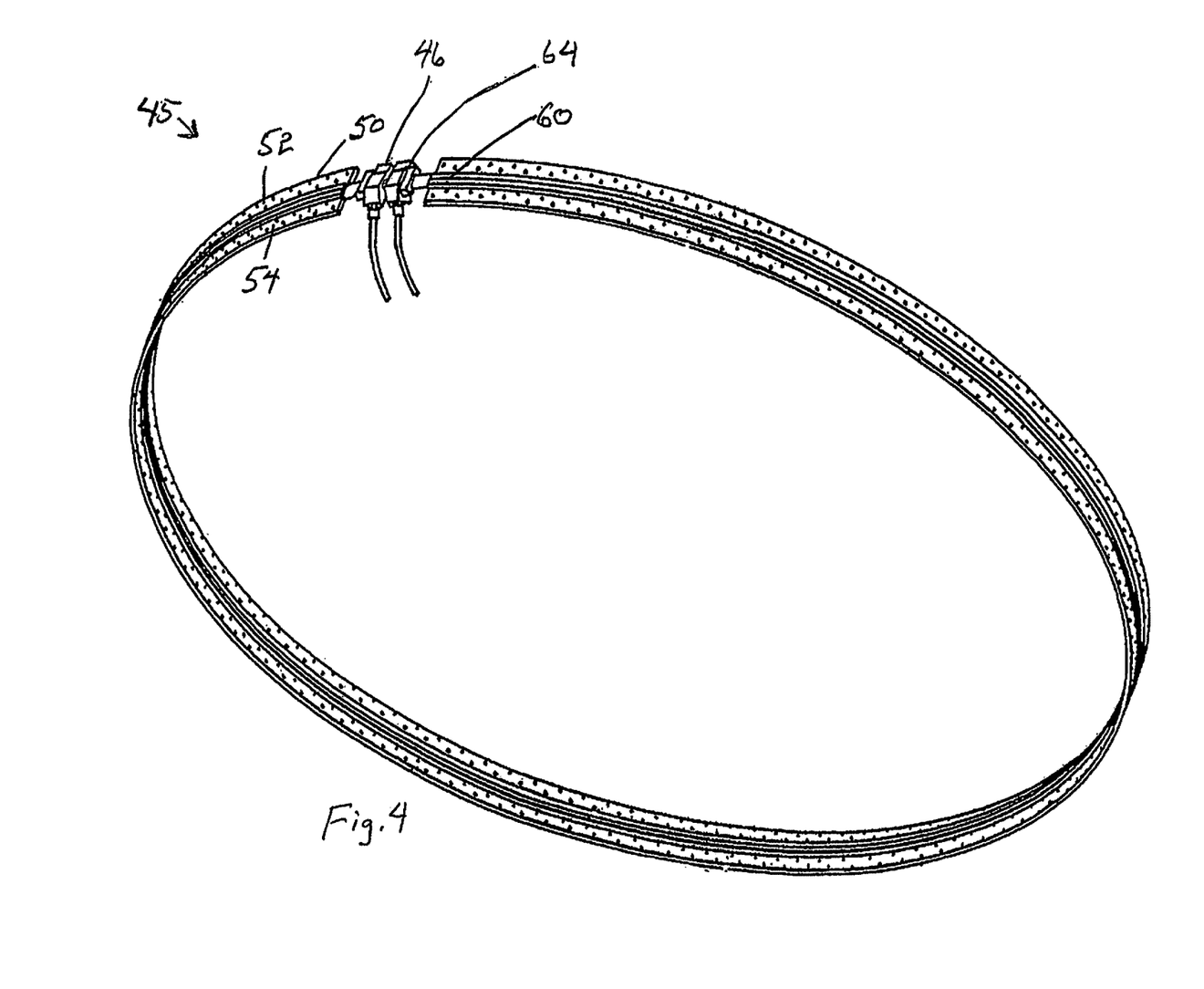
FIG. 4 is an exploded view of components of an explosive separation joint system in accord with embodiments herein.
Figure 5:
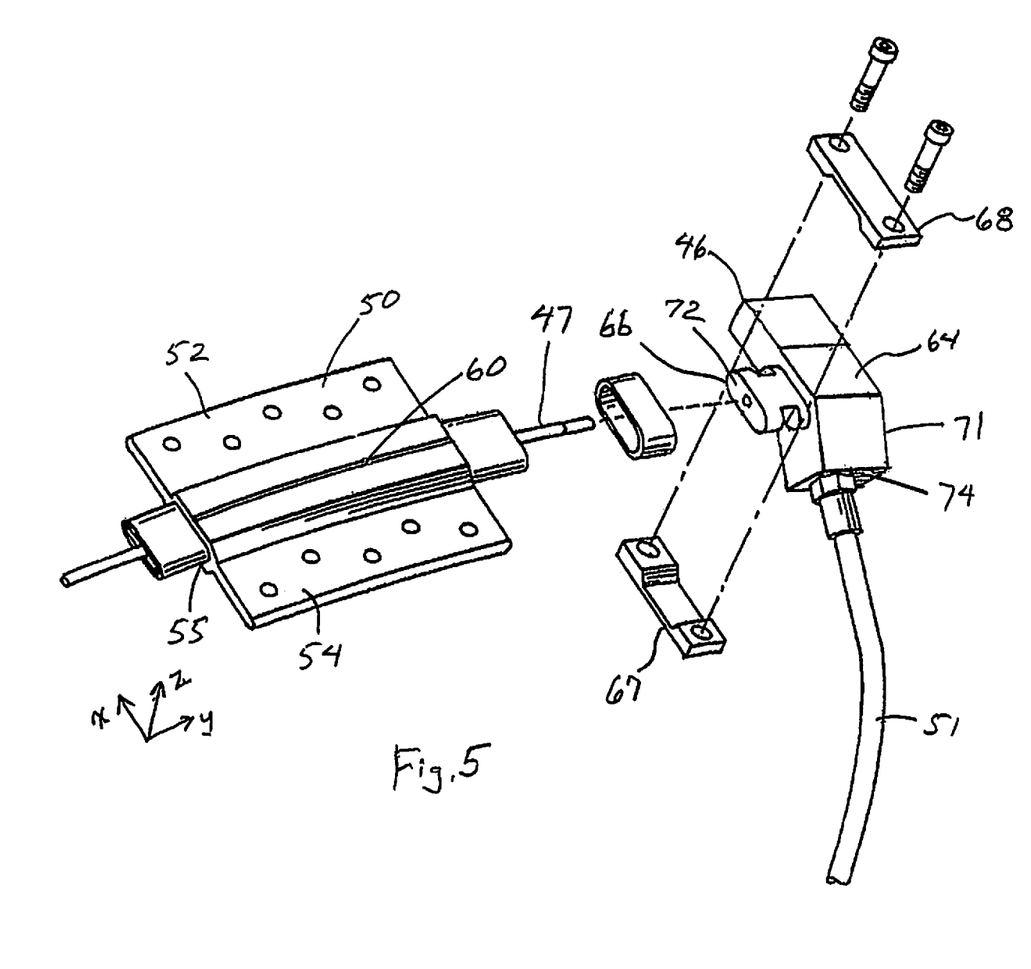
FIG. 5 is a perspective view of an explosive separation joint system in accord with embodiments.
Figures 6, 7:
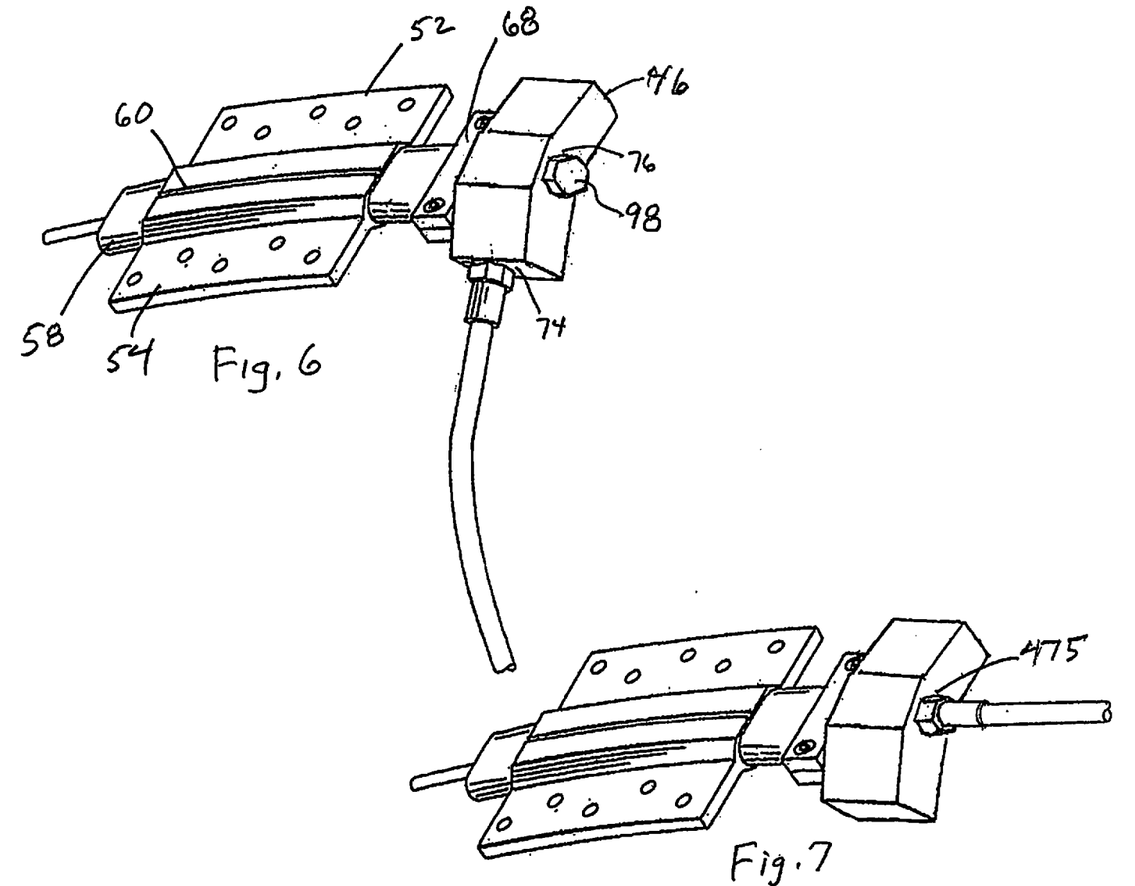
FIG. 6 is a perspective view of an explosive separation joint system in accord with embodiments.
FIG. 7 is a cross sectional view of a manifold of an explosive separation joint system in accord with embodiments.

Referring to FIGS. 1 and 3, cross sectional views of an explosive separation joint system 20 having a manifold 22, a joint 23 comprising a pair of separable and unitary joint portions 24, 26, a mild detonating fuse (MDF) 28 supported in an elastomeric material 29 in a flattened metal tube 30 and extends into the manifold at a port 32. The MDF including a MDF booster 34, attached thereto in an open interior 36 and in alignment with an initiating ordnance port 37 and an initiating ordnance (IO) in a tube 38 having an ordnance end tip 39. FIG. 1 shows the IO end tip in alignment with the MDF booster such that when the IO is detonated the end tip sends an axial pulse toward the MDF booster which detonates the MDF line portion 40 causing expansion of the flattened metal tube 30, fracturing apart the unitary joint portions at the grooves 42.

Referring to FIG. 2, the inventors have discovered a failure path whereby the MDF moves in the manifold such as due to the extreme conditions of temperature, vibration, shock, acceleration, and stress that the joint is subjected to during launch. The MDF, which is generally not fixed in place with respect to the joint 23 is illustrated in FIG. 2 as no longer in axial alignment with the IO and likelihood of the IO firing the MDF has been reduced. In an alternative failure mode, the MDF booster may move in the opposite direction such that the booster is moved past the cavity 41 such that it does not receive the direct impulse from the ordnance end tip 39. In such a position the MDF is also less likely to detonate.

Referring to FIGS. 4-6, and 8 an explosive separation joint system 45 in accord with embodiments is illustrated that addresses the issue above and provides benefits and advantages over known systems. The explosive separation joint 45 generally comprises a manifold 46, a MDF 47, a joint 50, and an IO 51. The joint 50 is comprised of two unitary portions 52, 54, that define a cavity 55 that contains a flattened metal tube 58 that expands to a form with a circular cross section upon detonation of the MDF 47 contained therein fracturing the joint at the grooves 60. The MDF extends from the metal tube 58 into a manifold 46 or manifolds 46, 64. In embodiments two adjacent manifolds may be combined into one. The metal tube being clamped to boss 66 by way of clamp members 67, 68. A sleeve 70 may provide containment of the flattened metal tube that is not clamped to the boss and not within the joint 50.

Exemplary MDF's, IO's, manifolds, and other relevant components are disclosed in U.S. Pat. Nos. 3,698,281; 5,327,835; 5,331,894; 5,365,851; 5,390,606; 5,417,162; 5,535,502; 5,898,123; and 6,021,715. These patents are incorporated by reference herein for all purposes.

Figure 8:
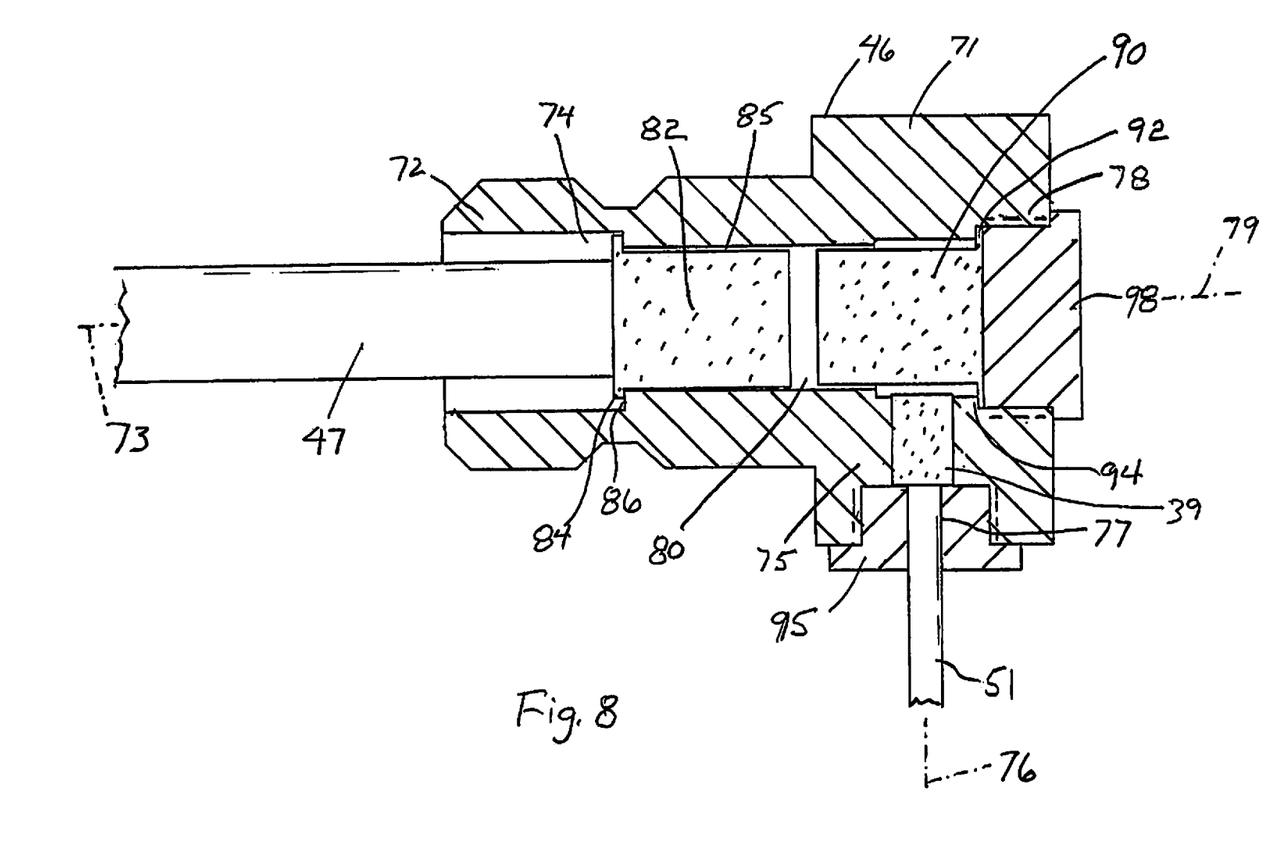
FIG. 8 is a cross sectional view of a manifold of an explosive separation joint system in accord with embodiments.

The manifold 46 comprises a body portion 71 with an MDF port 72 having the MDF 47 therein, and having a MDF axis 73 and a MDF passageway 74. The manifold further having an IO port 75 with the IO 51 therein and having an IO axis 76 and an IO passageway 77. Further, the manifold having a transfer booster port 78 with a transfer booster port axis 79. The passageways defining an interior 80. The MDF has a MDF booster 82 attached there to, which includes a flange 84 that sits upon a shoulder portion 86 of the manifold in the MDF port. The flange 84 limits movement of the MDF in toward the transfer a booster port 78 while allowing movement in an opposite direction. The MDF booster diameter is sized to be less that the MDF port opening 85 diameter providing a sliding fit. Contained within the transfer booster port is a transfer booster 90 which has a flange 92, which is secured on a shoulder 94 of the transfer booster port, and is fixed in position by the threaded fitting 98 or plug. The transfer booster 90 is in axial alignment with the MDF booster such that detonation of the transfer booster has a high certainty of detonating the MDF booster and the consequently, the MDF. The transfer booster may comprise an HNS-IA explosive. The IO with the initiating ordnance end tip 39 in the IO port is secured therein by a threaded fitting 95.

The IO end tip 39 is in direct alignment with and direct linear access to the transfer booster. With the transfer booster and IO fixed in place, misalignment of these components is not of concern. Detonation of the IO will immediately detonate the transfer booster which will immediately, with an extreme degree of reliability, detonate the MDF by way of the MDF booster. Movement of the MDF booster away from the transfer booster does not significantly affect the detonation reliability due to the existence of the direct linear path and access between the two.

Figure 9:
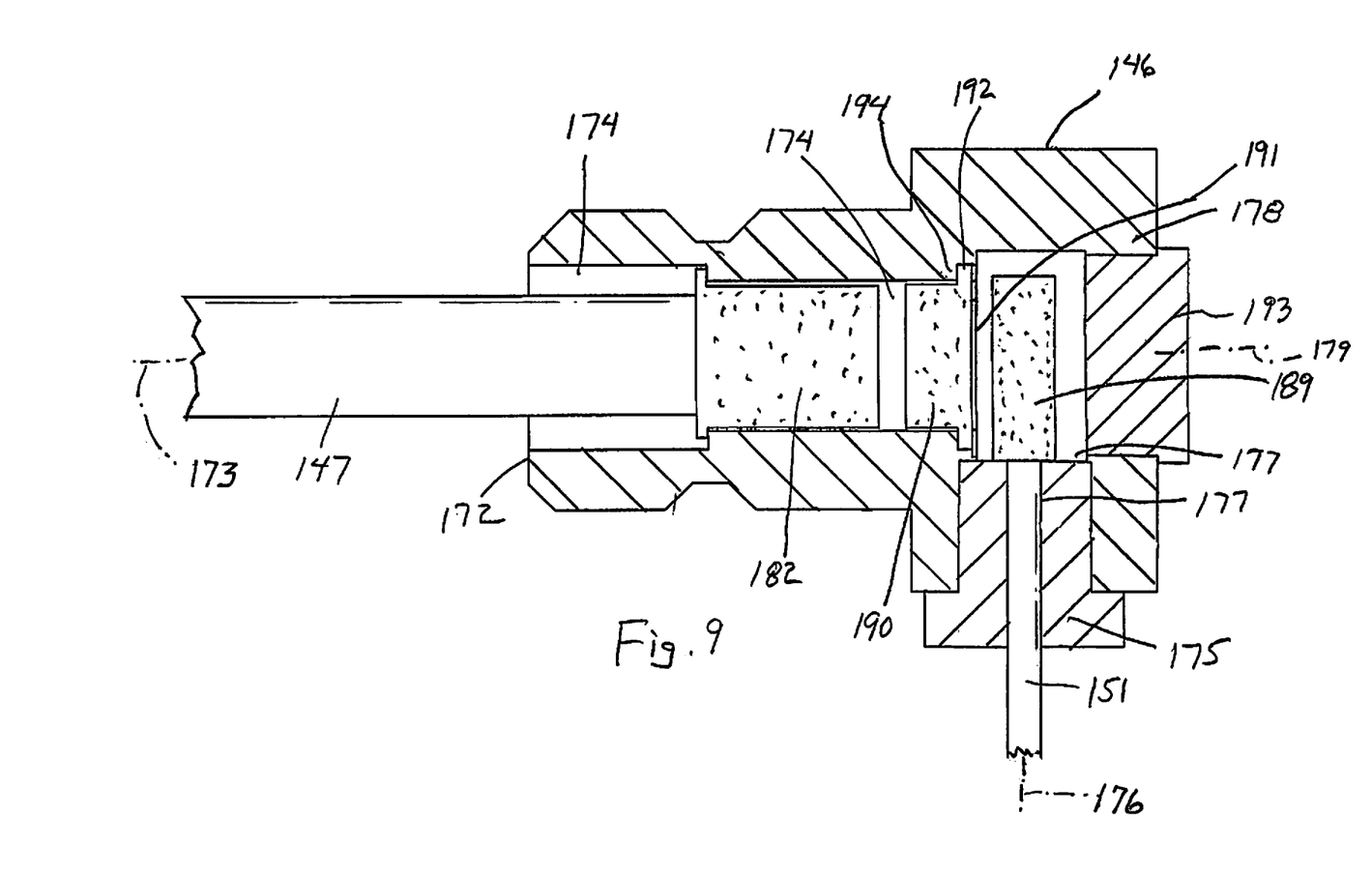
FIG. 9 is a cross sectional view of a manifold of an explosive separation joint system in accord with embodiments.

Referring to FIG. 9, another embodiment is illustrated with a manifold 146 having the MDF port 172, a MDF axis 173, and a MDF passageway 174. The manifold also has an IO port 175, an IO axis 176, and an IO passageway 177 having an IO and an IO end tip. The respective axis and passageways arranged in a perpendicular orientation. In this embodiment, the MDF port axis, the MDF 147, the MDF booster 182, the transfer booster 190, the IO 151, and the IO end tip 189 are all coaxial. The transfer booster secured in place by a unitary flange 192 and an securement means such as a threaded ring or snap ring 191 and may be installed through the transfer booster port 178 closeable with a threaded plug 193. Detonation of the IO instantly detonates the transfer booster 190 which then detonates the MDF 147 by way of the MDF booster 182. The direct linear relationship between each sequential detonating member assures reliability in detonation.

Figure 10:
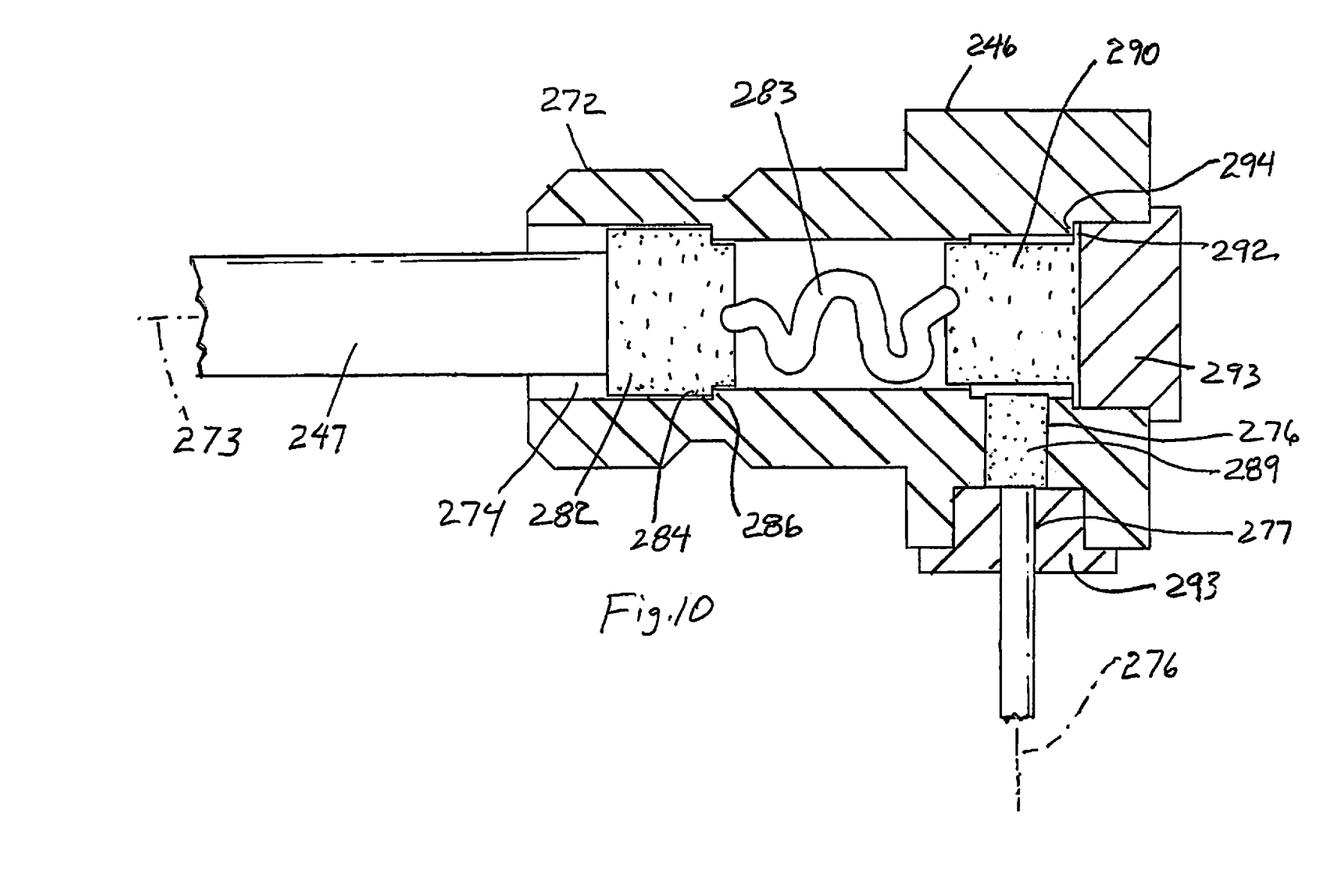
FIG. 10 is a cross sectional view of a manifold of an explosive separation joint system in accord with embodiments.

Referring to FIG. 10, in another embodiment, a manifold 246 is illustrated with the MDF port and passageway axis 273 and IO port and passageway axis 276 again positioned perpendicular to one another. In this embodiment, the separation of the MDF booster 282 from the transfer booster 290 is accommodated by a flexible transfer element 283 is bonded to the transfer booster and the MDF booster. The MDF is limited from moving axially towards the transfer booster by the enlarged diameter portion or flange 284 abutting against shoulder 286. The flexible transfer element assures that the detonation impulse will reliably be passed from the transfer booster 290 to the MDF 247. The IO end tip 289 is fixed into position by way of the threaded fitting 293 and is positioned with a gap at the outer cylindrical circumference 295 of the transfer booster 290. The transfer booster is secured in place by the threaded member configured as a plug 298 with the flange 292 of the booster sandwiched between the shoulder 294 and the threaded member 298. The flexible transfer element is coiled or compacted and sized to allow movement of a certain anticipated amount of the MDF in the MDF port and in the flattened metal tube such that any movement of the MDF due to the extreme conditions of temperature, vibration, shock, acceleration, and stress that the joint may be subjected to during launch is accommodated and the reliability of the explosive separable joint system is optimized.

Figure 11:
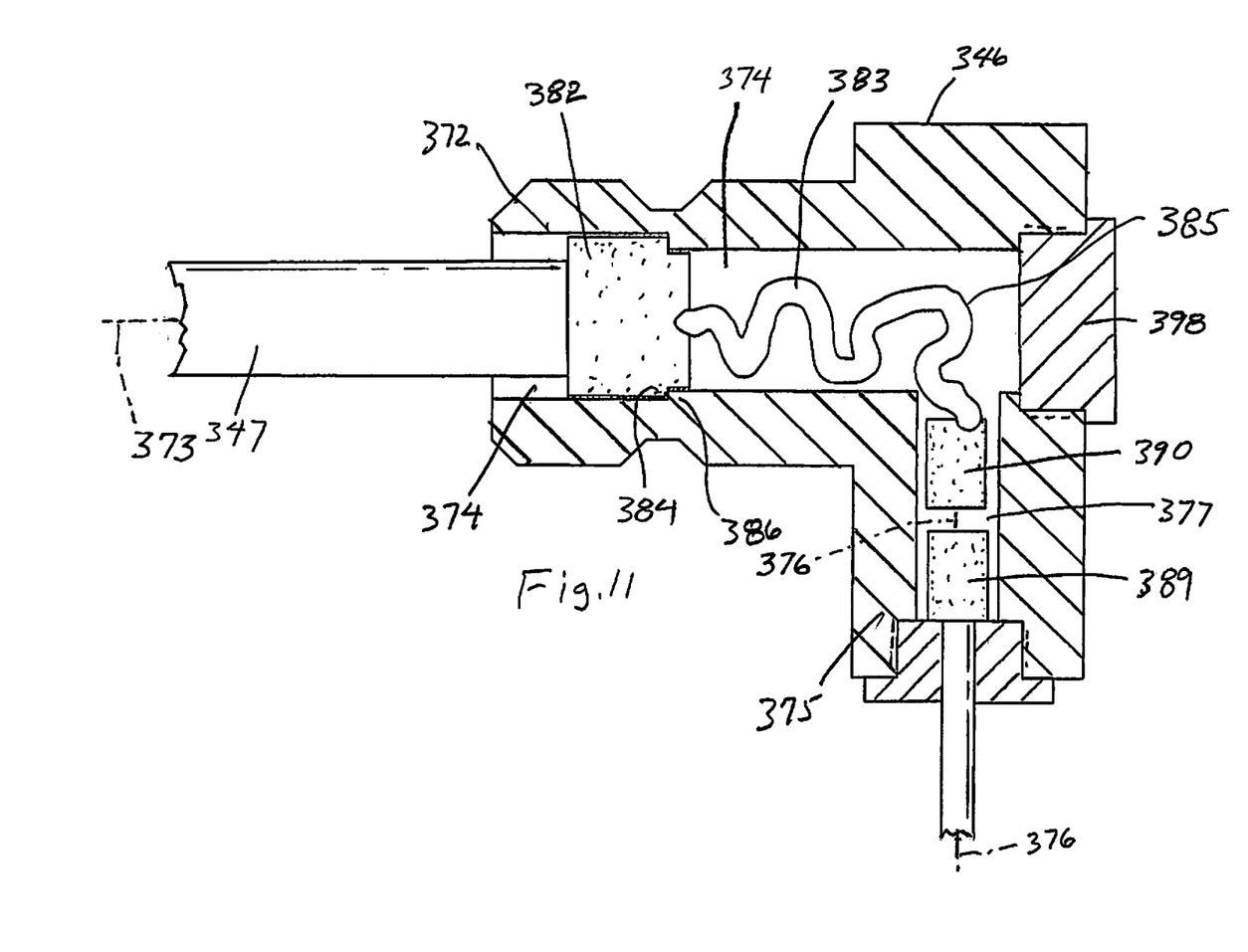
FIG. 11 is a cross sectional view of a manifold of an explosive separation joint system in accord with embodiments.

Referring to FIG. 11, in embodiments, a manifold 346 is illustrated with the MDF port 372 and MDF passageway 374, and MDF axis 373. An IO port 375, having a IO passageway 377 and an IO axis 376, are positioned perpendicular to the MDF in the port, the MDF axis, and the MDF passageway. In this embodiment, the separation of the MDF booster 382 from the transfer booster 390 is again accommodated by a flexible transfer element 383 that is bonded to the transfer booster and the MDF booster. The transfer element may have folds 385 providing enhanced elongation capability of the transfer element upon movement of the MDF booster 382. The flexible transfer element effectively extends the impulse train from detonation of the end tip 389 of the IO around the corner defined by the MDF passageway and the IO passageway. The detonation of the end tip detonates the transfer booster 390, to which the flexible transfer element 383 is attached. The flexible transfer unit also being attached to the MDF booster 382. The MDF 347 is limited from moving axially towards the transfer booster by the enlarged diameter portion or flange 384 abutting against shoulder 386. The flexible transfer element assures that the detonation impulse will reliably be passed from the transfer booster 390 to the MDF 347. The IO end tip 389 is fixed into position by way of the threaded fitting 393 and is positioned with a gap at the outer cylindrical circumference 395 of the transfer booster 390. The transfer booster is positioned in the IO passageway displaced from the MDF passageway. The flexible transfer element is folded, coiled or compacted and sized to allow movement of a certain anticipated amount of the MDF in the MDF port and in the flattened metal tube such that any movement of the MDF due to the extreme conditions of temperature, vibration, shock, acceleration, and stress that the joint may be subjected to during launch is accommodated and the reliability of the explosive separable joint system is optimized. In embodiments the flexible transfer element may be attached to the IO end tip.

Figure 12:
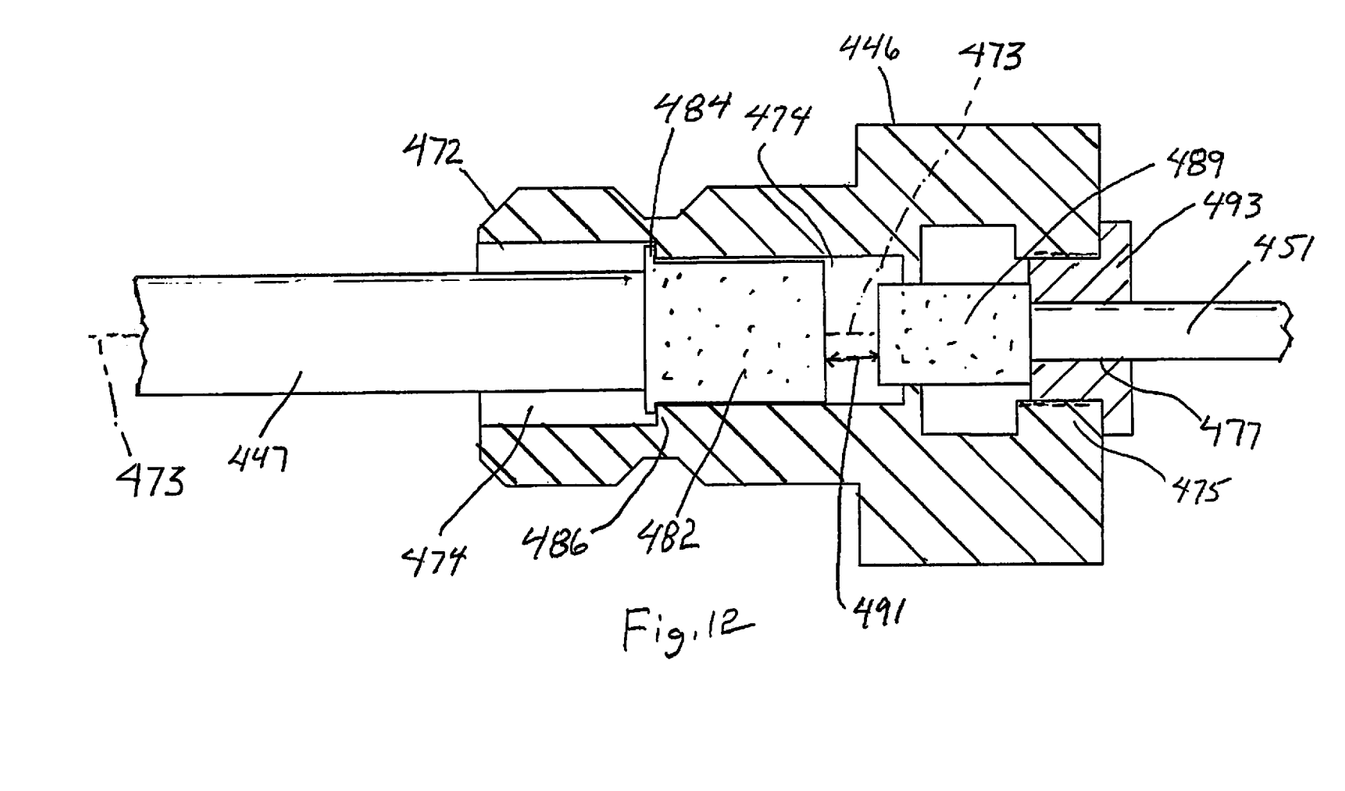
FIG. 12 is cross sectional view of a manifold of an explosive separation joint system in accord with embodiments.

Referring to FIG. 12, in embodiments, a manifold 446 is illustrated with the MDF port 472 with an MDF 447 therein and IO port 475 with an IO 451 therein. The axis 473, of the MDF 447 in the port and the MDF passageway 474, is also the axis of the IO passageway 477 and the IO in the IO port. The detonation of the IO end tip 489 directly detonates the MDF booster 482 due to their direct proximity and direct linear access, that is, with no passageway turns or corners therebetween. The MDF 447 may be limited from moving axially towards the IO 451 by the enlarged diameter portion or flange 484 abutting against shoulder 486. The IO end tip 489 is fixed into position by way of the threaded fitting 493 and is positioned with an initial gap 491 between the end tip 489 and the MDF booster 482. The gap may increase when the MDF moves due to the extreme conditions of temperature, vibration, shock, acceleration, and stress that the joint and MDF may be subjected to during launch. Such movement is accommodated by the coaxial arrangement of the MDF and IO whereby the direct linear access, without passageway turns, is maintained providing enhanced reliability of the explosive separable joint system.

Figure 13:
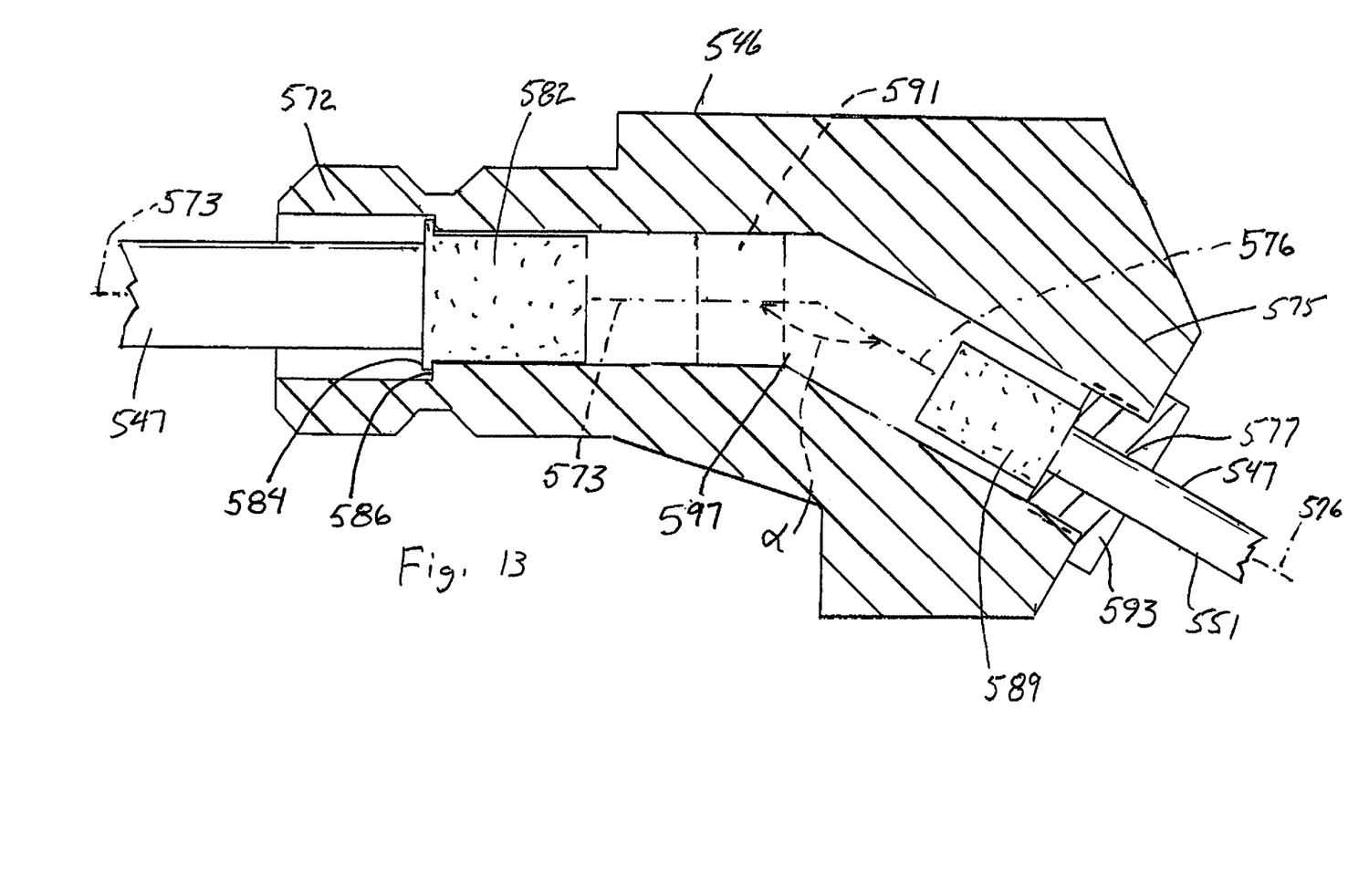
FIG. 13 is cross sectional view of a manifold of an explosive separation joint system in accord with embodiments.

Referring to FIG. 13, in embodiments, a manifold 546 is illustrated with the MDF port 572 with an MDF 547 therein and IO port 575 with an IO 551 therein. The axis 573, of the MDF 547 in the port and the MDF passageway 574 is at an obtuse angle α with respect to the IO axis 576 of the IO passageway 577 and the IO in the IO port. The detonation of the IO end tip 589 directly detonates the MDF booster 582 due to their direct proximity and direct or near direct linear access, that is, with no 90° passageway turns therebetween. In embodiments, the angle between the MDF axis and the IO axis is 130° or more up to 180°. The MDF 547 may be limited from moving axially towards the IO 551 by the enlarged diameter portion or flange 584 abutting against shoulder 586. The IO end tip 589 is fixed into position by way of the threaded fitting 593 and is positioned with an initial gap 591 between the end tip 589 and the MDF booster 582. The gap may increase when the MDF moves due to the extreme conditions of temperature, vibration, shock, acceleration, and stress that the joint and MDF may be subjected to during launch. Such movement is accommodated by the near coaxial arrangement of the MDF and IO whereby the direct access, without sharp passageway turns, is maintained providing enhanced reliability of the explosive separable joint system. In embodiments, a transfer booster 589 may be inserted at or proximate the intersection 597 of the MDF passageway and IO passageway. The transfer booster may be secured in place by snap rings, threaded rings, or other securement means.

Figure 14:
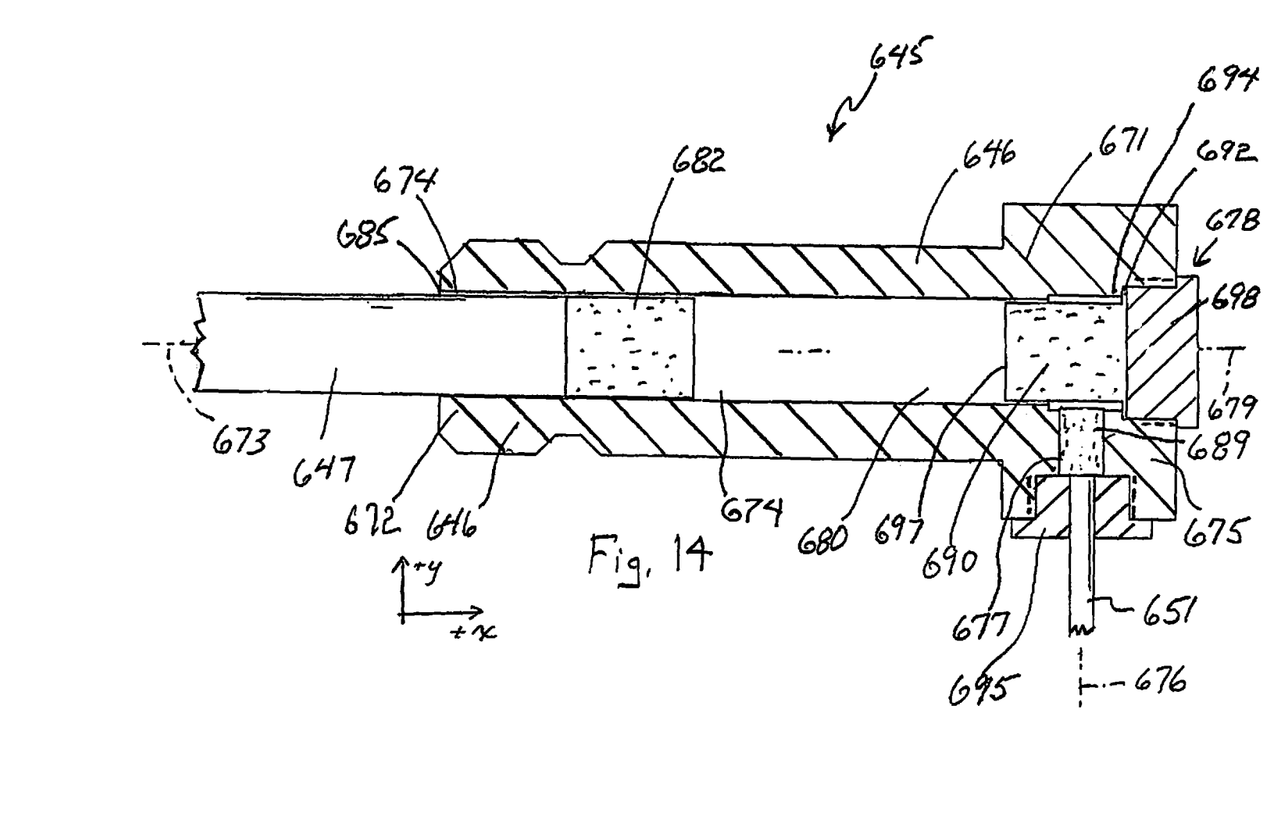
FIG. 14 is a cross sectional view of a manifold of an explosive separation joint system in accord with embodiments.

Referring to FIG. 14, an explosive separation joint system 645 in accord with embodiments is illustrated. The explosive separation joint 645 generally comprises a manifold 646, a MDF 647, an IO 651. The manifold 646 comprises a body portion 671 with an MDF port 672 having the MDF 647 therein, and having a MDF axis 673 and a MDF passageway 674. The manifold further having an IO port 675 with the IO 651 therein and having an IO axis 676 and an IO passageway 677. Further, the manifold having a transfer booster port 678 with a transfer booster port axis 679. The passageways defining an interior 680. The MDF has a MDF booster 682 attached there to, which does not includes a flange as shown in previous embodiments. The movement toward the IO port, in the +x direction, is limited by a transfer booster 690 which provides a stop surface 697 that the MDF booster may engage. This configuration with the flangeless MDF booster may be utilized in the other embodiments disclosed in FIGS. 8-13. The MDF booster diameter is sized to be less that the MDF port opening 685 diameter providing a sliding fit. Contained within the transfer booster port is the transfer booster 690 which has a flange 692, which is secured on a shoulder 694 of the transfer booster port, and is fixed in position by the threaded fitting 698 or plug. The transfer booster 690 is in axial alignment with the MDF booster such that detonation of the transfer booster has a high certainty of detonating the MDF booster and the consequently, the entire MDF. The IO 651 with the initiating ordnance end tip 689 in the IO port is secured therein by a threaded fitting 695. The joint system may be assembled with the MDF booster initially engaged with the stop surface or with a gap therebetween. When assembled with a gap between the MDF booster and the transfer booster, movement of the MDF in axial direction, that is, the +x and the −x directions, is provided.

Figures 15, 16:
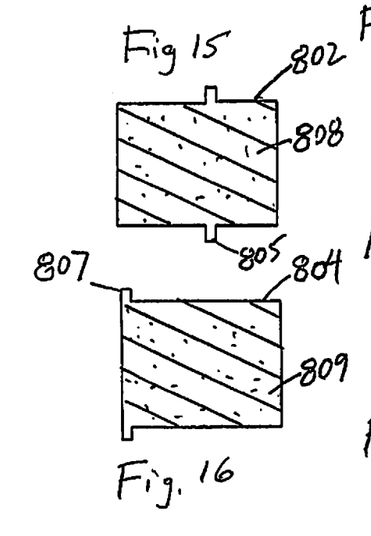
FIG. 15 is a cross sectional view of a transfer booster with a unitary flange.
FIG. 16 is a cross sectional view of a transfer booster with a unitary flange.
Figure 17A:
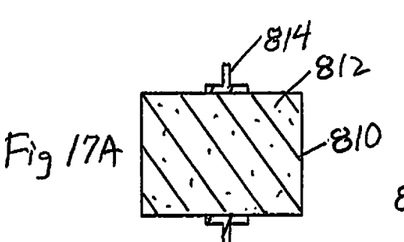
FIG. 17A is a side view of a transfer booster with an attached unitary flange.
Figure 17B:
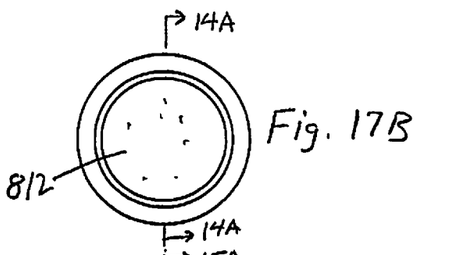
FIG. 17B is an end view of the transfer booster of FIG. 16A with an attached unitary flange.
Figures 18A, 19A:
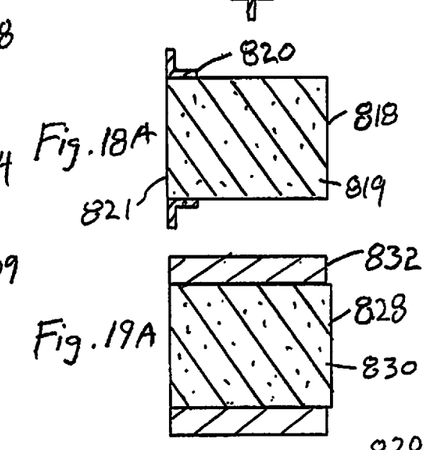
FIG. 18A is a side view of a transfer booster with an attached unitary flange.
FIG. 19A is a side view of a transfer booster with an attached unitary flange.
Figures 18B, 19B:
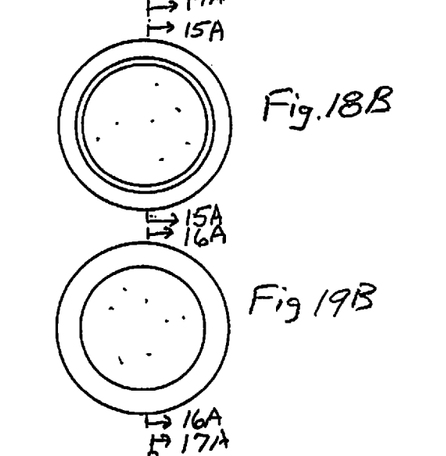
FIG. 18B is an end view of the transfer booster of FIG. 16A with an attached unitary flange.
FIG. 19B is an end view of the transfer booster of FIG. 16A with an attached unitary flange.
Figure 20A:
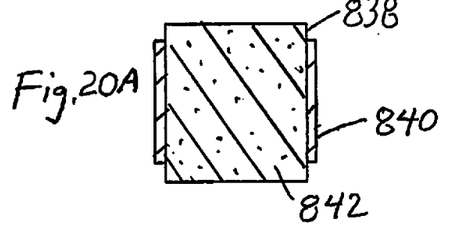
FIG. 20A is a side view of a transfer booster with an attached unitary flange.
Figure 20B:
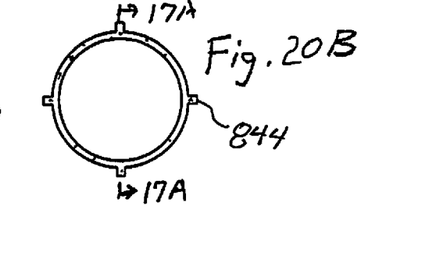
FIG. 20B is an end view of the transfer booster of FIG. 16A with an attached unitary flange.

Referring to FIGS. 15-20B, various configurations of transfer boosters with flanges are illustrated. FIGS. 15 and 16 illustrate boosters 802, 804 with flanges 805, 807 unitary with the booster explosive material of the booster bodies 808, 809. FIGS. 17A and 17B illustrate a booster with a cylindrical body 810 and an axially central annular flange 814. The flange may be made of metal, polymers, or other form holding materials. FIGS. 18A and 18B illustrate a booster 818 with a cylindrical booster body 819 and an annular flange 820 with an L-shaped cross section at an end 821 of the body. FIGS. 19A and 19B illustrate a booster 828 with a cylindrical body 830 with a ring flange 832 extending substantially the axial length of the body. FIGS. 20A and 20B illustrate a booster 838 with a flange axially 840 centered on the booster body 842 with axial ribs 844. The flanges may be bonded or welded to the bodies and the manifold body appropriated configured for receiving the transfer boosters with flanges.

In embodiments where the separation joint system is circular extending 360° and the MDF extends entirely around the joint, it is advantageous, for the purpose of redundancy, to detonate both sides of the MDF and two adjacent manifolds may utilized, or a single manifold with four ports, two IO ports and two MDF ports may be used. In embodiments a single IO port may have an IO detonate a transfer booster that then detonates two MDF boosters attached to the opposite ends of a single circular MDF. The two MDF boosters in direct non-contact alignment in a passageway with the transfer booster. In embodiments, for redundancy, two IO's may be utilized with one or two transfer boosters intermediate and in direct alignments in a passageway with two MDF boosters, each MDF booster attached to one end of the circular MDF.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed The above references in all sections of this application are herein incorporated by reference in their entirety for all purposes.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

We claim:

1. A separation joint system comprising:
a pair of deformable and separable joint portions extending circumferentially on a pair of separable vehicle portions, the pair of separable joint portions defining a cavity therein;
a mild detonating fuse contained in an expandable metal tube conformingly positioned in the cavity;

a manifold comprising a body, the manifold having a mild detonating fuse port with a boss for receiving the expandable metal tube and having a mild detonating fuse passageway with a mild detonating fuse port axis extending linearly into the manifold body, the manifold further having an initiating ordnance port having an initiating ordnance passageway with an initiating port axis extending linearly into the manifold body perpendicularly with respect to the mild detonating fuse passageway, the initiating port passageway being in communication with the mild detonating fuse port passageway;

the mild detonating fuse having at least one end portion extending out of the expandable metal tube and extending into the mild detonating fuse port, the end portion having a mild detonating fuse booster attached thereto;

an initiating ordnance having an end portion with an end tip positioned in the initiating ordnance port;

a transfer booster positioned intermediate the initiating ordnance end tip and the mild detonating fuse booster attached to the end portion of the mild detonating fuse, the transfer booster spaced from and in axial alignment with at least one of the mild detonating fuse port and the initiating ordnance port whereby detonation of the transfer booster by the initiating ordnance causes detonation of the mild detonation fuse booster and detonation of the mild detonation fuse thereby expanding the tube, deforming and fracturing the joint whereby the joint portions separate from one another.

2. The separation joint system of claim 1 wherein the mild detonation fuse booster extends into and is axially movable within the mild detonation passageway.

3. The separation joint system of claim 1, wherein the transfer booster has cylindrical body and a circular flange extending radially outward from the cylindrical body and wherein the manifold has an annular seating shoulder, and wherein the circular flange is secured on the annular seating shoulder.

4. The separation joint system of claim 2, wherein the transfer booster has an axis and is in axial alignment with the mild detonation fuse booster.

5. The separation joint system of claim 2 wherein the mild detonating fuse port and the initiating ordnance port are perpendicular to each other defining an intersection coaxial to both the mild detonating fuse port and the initiating ordnance port, and wherein the transfer booster is positioned at the intersection.

6. The separation joint system of claim 2, wherein the mild detonating fuse is fixed to the mild detonating booster by a flexible transfer element and the mild detonating fuse and mild detonating fuse booster are axially movable within the mild detonating fuse port.

7. The separation joint system of claim 2, wherein the manifold has a transfer booster port for insertion of the transfer booster.

8. The separation joint system of claim 7, wherein the transfer booster port having a shoulder portion for seating a flange of the transfer booster, the transfer booster having a flange seated at the shoulder.

9. The separation joint system of claim 1, wherein the pair of separable joint portions have two ends with each end connecting to the manifold, and wherein the mild detonating fuse port is a first mild detonating fuse port and the manifold comprises a second mild detonating fuse port on a manifold end opposite an end where the first mild detonating fuse port is located.

10. A separation joint system comprising:
a pair of deformable and separable joint portions for extending circumferentially on a pair of separable vehicle portions, the pair of separable joint portions defining a cavity therein;

a manifold comprising a body, the manifold connecting to the expandable metal tube and having a mild detonating fuse port with a mild detonating fuse passageway extending linearly into the manifold body, the manifold further having an initiating ordnance port with an initiating ordnance port passageway extending linearly into the manifold body and being in communication with the mild detonating fuse port;

a mild detonating fuse contained in an expandable metal tube conformingly positioned in the cavity defined by the separable joint portions;

wherein the mild detonating fuse having at least one end portion extending out of the expandable metal tube and extending into the mild detonating fuse port, the at least one end portion not being axially fixed within the mild detonating fuse port, a mild detonating fuse booster positioned at the end portion of the mild detonating fuse, a flexible transfer element connected to the mild detonating fuse booster an initiating ordnance having an end portion with an end tip positioned in the initiating ordnance port;

a transfer booster positioned intermediate the initiating ordnance end tip and the mild detonating fuse booster positioned at the end portion of the mild detonating fuse, the transfer booster in axial alignment with at least one of the mild detonating fuse port and the initiating ordnance port.

11. The separation joint system of claim 10, wherein the mild detonating fuse booster has cylindrical body and a circular flange extending radially outward from the cylindrical body and wherein the manifold has a circular seating shoulder, and wherein the circular seating shoulder defines a maximum axial insertion position for mild detonating fuse booster.

12. The separation joint system of claim 10, wherein the mild detonating fuse port and the initiating ordnance port are perpendicular to each other defining an intersecting portion coaxial to both the mild detonating fuse port and the initiating ordnance port, and wherein the transfer booster is positioned at the intersecting portion.

13. The separation joint system of claim 10, wherein the transfer booster is axially movable within one of the mild detonating fuse passageway and an initiating ordnance passageway at the initiating ordnance port.

14. The separation joint system of claim 10, wherein the transfer booster is fixed in place in the manifold.

15. The separation joint system of claim 10, wherein the transfer booster has a flange for positioning the transfer booster in place.

16. The separation joint system of claim 15, wherein the manifold has a transfer booster port and the transfer booster is secured in place by a threaded fitting at the transfer booster port.

17. An explosive separation joint system, the separation joint system comprising:
manifold comprising a body portion having a first port for receiving a mild detonating fuse, the first port having a boss for receiving a flattened metal tube for containing the mild detonating fuse, the body portion further having a second port for receiving a initiating ordnance, a passageway extending between the first and second port, and a third port extending into the passageway and coaxial with one of the first port and second port, the third port for receiving a transfer booster, each of the ports having interior threads for receiving threaded members; and a separable joint for connecting to the manifold, the separable joint comprising a pair of deformable and separable joint portions with a cavity defined therebetween and a mild detonating fuse in the cavity, the flattened metal tube expandable to a circular cross section, a mild detonating fuse conformingly positioned in the cavity, the separable joint having a flattened end conformingly sized to fit the boss of the first port.

18. The explosive separation joint system of claim 17, wherein the flattened end is connected to the boss at the first port, and the mild detonating fuse has a booster attached thereto, the booster positioned in the passageway extending between the first and second ports.

19. The explosive separation joint system of claim 18, further comprising a transfer booster positionable intermediate the first port and second port.

20. The explosive separation joint system of claim 19, further comprising an initiator ordnance positioned in the initiating ordnance port.

* * * * *